INVENTOR.
RICHARD R. STRACK
BY
ATTORNEY

3,669,772
METHOD FOR PRODUCING FLEXIBLE IMAGE TRANSPORTING FIBER OPTIC CONDUIT

Richard R. Strack, Sturbridge, Mass., assignor to American Optical Corporation, Southbridge, Mass.
Filed July 2, 1970, Ser. No. 51,977
Int. Cl. C03c 15/00; G02b 5/16
U.S. Cl. 156—15
7 Claims

ABSTRACT OF THE DISCLOSURE

A process for essentially completely eliminating acid soluble cladding from an optical fiber bundle. An acid soluble clad coherent optical fiber bundle is coated with an acid resistant coating except for an area adjacent each end, and the resulting exposed areas are acid leached to remove all the acid soluble glass therefrom, leaving a flexible area adjacent each end. The fibers in these areas are fused together holding the fibers in coherency. The ends of the bundle are removed from about the middle of the fused sections, and the acid resistant coating removed. The acid leachable cladding is then leached from the remainder of the bundle, leaving a flexible, image transporting bundle having fused coherent opposite ends.

BACKGROUND OF THE INVENTION

Field of the invention

Fiber optics with particular reference to the manufacture of flexible fiber optic image transporters.

Description of the prior art

A fiber optic, image transporting bundle consists of a plurality of optical fibers having their corresponding opposite ends coherently oriented. In one typical operation to produce a flexible, coherent image transporting bundle, each of a plurality of optical monofibers or multifibers is given a cladding of acid soluble glass. A plurality of such coated fibers are gathered together in an orientated bundle and fused into a rigid bundle. The bundle ends are potted with an acid resistant coating to maintain the orientation in subsequent operations. The orientated bundles may be heated and drawn, and then subjected to an acid leaching operation. The leaching operation removes much of the acid-soluble glass from the interstices between the fibers leaving the bundle flexible. However, the leaching or etching does not affect the acid soluble coating on the fiber interiorly of the resin potted ends. Experience has shown that leaching occurs generally radially of the conduit, and that at the conclusion of the etching operation there remains a cone of unetched glass at the transition zone adjacent the potted ends of the bundle. This cone, if large, results in a weakening of the bundle. Furthermore, this acid-soluble glass in the end of the bundle areas does not contribute to the optical performance of the bundle but, in fact, detracts therefrom by adding to the non-image carrying area of the bundle.

SUMMARY OF THE INVENTION

The method of the present invention comprises a technique for fabricating a flexible, coherent image transporting bundle having substantially no residual acid-soluble glass. The present method removes the unwanted glass from each end in such a manner as to maintain coherency of the fibers, and the acid resistant glass is further removed from the intermediate portions of hte bundle, leaving it flexible. The results of the present invention are a significant improvement of the image resolving capabilities of the image transporting bundles and structural improvement thereof contributing to greater resistance to breakage.

Included among the objects and advantages of the present invention is a method for providing an improved fiber optic, image transporting bundle;

Another object of the invention is to provide a method for improving the resolution of flexible image transporting fiber optic bundles;

A further object of the invention is to provide a method for minimizing the amount of acid-soluble glass found in flexible image transporting fiber optic bundles;

A still further object of the invention is to provide a method of producing a flexible image transporting bundle having improved image resolving capabilities.

These and other objects and advantages of the invention may be readily ascertained by referring to the following description and appended drawing.

DESCRIPTION OF THE PREFERRED EMBODIMENT

Figure 1:
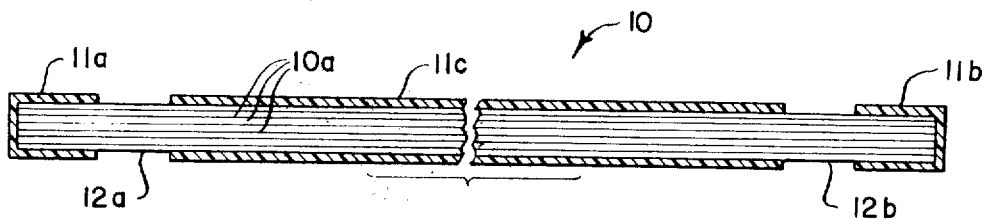
FIG. 1 is a partially cross-sectioned side elevational view of an image transporting fiber optic bundle in a condition for the practice of one step of the method according to this invention.

The technique of the present invention comprises the selective pre-etching and treating of two areas adjacent the ends of an image transporting fiber optic conduit prior to the final etching or leaching thereof. A bundle 10, FIG. 1, of image transporting fibers 10a includes an acid resistant coating 11a, 11b and 11c of plastic material or wax or the like. Each fiber in this case has been given an outer cladding of acid-soluble glass and the bundle has been heated and drawn to the cross-sectional size desired of the final flexible image transporter to be formed therefrom. The heating and drawing fuses the fibers together as a rigid coherent bundle, i.e. a bundle having the corresponding opposite ends of its fibers identically geometrically patterned.

Following the drawing and coating process, unprotected areas 12a and 12b between the end and central coatings of acid resistant material are etched or leached to remove the acid-soluble glass from around all fibers in these areas. Areas 12a and 12b may, for example, each be approximately one-half inch in length.

Figure 2:
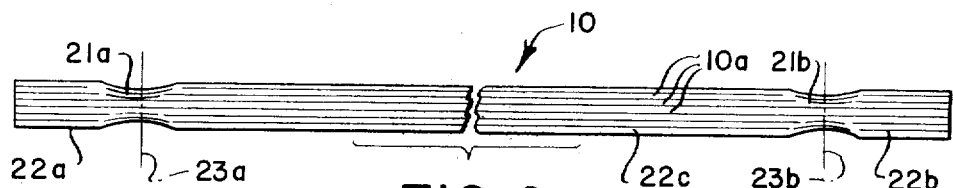
FIG. 2 is a similar side elevational of the bundle subsequent to the practice of said one step of the method.

This first etching operation results in the provision of two somewhat flexible areas with acid-soluble glass remaining throughout the central and opposite end portions of the bundle which maintain the fiber orientation. The acid resistant coatings 11a, 11b and 11c are next removed, and the areas 12a and 12b, now being free of the acid-soluble connecting glass, are compacted by heating and squeezing whereby fibers 10a are fused together in these areas. In FIG. 2, sections 21a and 21b are the compacted and fused areas and sections 22a, 22b and 22c are the still rigid unetched sections having acid-soluble glass around the fibers 10a.

It has been found that a pressure of about 1000 p.s.i. at a temperature of approximately 1100–1200° F. is sufficient to fully compact and fuse the fibers together in areas 12a and 12b.

An alternative method of bringing the fibers together and securing them in the aforementioned position is to apply epoxy resin or other cement or adhesive material to the leached areas 12a and 12b and then to squeeze down on the fibers with a material to which the cement or epoxy will not adhere. One useful material is Teflon (Du Pont trademark for a tetrafluoroethylene) which, as a band pulled down on the fibers may form the squeezing material. In any case, the quantity of cement epoxy resin applied to the flexible area should be so controlled that only a very thin layer thereof remains between the fibers after the squeezing process.

Figure 3:
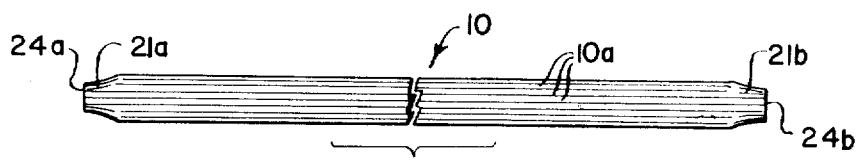
FIG. 3 is a side elevational view of the bundle with portions of its opposite ends removed and ready for a final leaching step.
Figure 4:
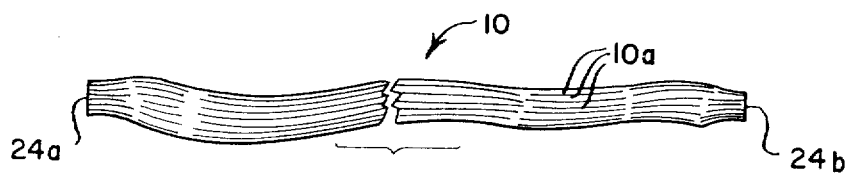
FIG. 4 is a side elevational view of the resulting leached fiber optic bundle.

When the fibers have been compacted and secured by either the fusing process or the cementing and squeezing process, opposite ends of fibers of the bundle will be held in coherent orientation. Each of the bundle ends 22a and 22b may then be cut off near the midpoint of the secured sections 21a and 21b along lines 23a and 23b respectively so as to remove ends 22a and 22b having acid-soluble fiber connecting glass therewithin. This leaves bundle 10 with ends 24a and 24b (FIG. 3) having the exposed ends of fibers 10a in secured together relationship with each other.

Bundle 10 is then placed in an acid bath which removes, i.e. leaches, the acid-soluble glass coatings from the bundle between its opposite ends 24a and 24b. This produces the ultimate flexible bundle which is freed of acid-soluble glass throughout its entire length. This second leaching operation is an essentially conventional operation. The ends of the bundle, however, need not be potted so as to preserve the coherent orientation of the fibers since the fibers at these ends are not secured together with acid-soluble glass.

The result of this second leaching operation is the removal of the acid-soluble fiber connecting glass in the intermediate bundle portion 22c so that this portion becomes a flexible section of the ultimate image transporting conduit.

In the process, the cladding of the optical fibers with an acid leachable glass is a known technique and a number of such acid leachable glasses are also known. The acid leach is conventionally performed in aqueous hydrochloric or sulfuric acid solutions (usually 1–20% solutions) and at a temperature of from room temperature to 65–70° C. Also, the cladding and drawing of optical fibers per se is a known process.

What is claimed:

1. A process for producing an improved, flexible image transporting conduit of optical fibers comprising:
    forming a bundle of light-conducting fibers each clad with an acid soluble glass;
    covering both ends and the intermediate portion of the length of said bundle with an acid resistant material leaving a relatively short portion of the bundle uncovered adjacent each covered end thereof;
    leaching said bundle with an acid so as to remove said acid-soluble glass substantially only from said uncovered portions;
    compacting said fibers in said leached uncovered portions and securing same tightly together;
    removing said acid-resistant materials from the ends and intermediate portion of said bundle;
    cutting transversely through said bundle at approximately the mid-point of each of said compacted and secured together portions to remove said initially covered ends of said bundle; and
    leaching said central portion of said bundle with an acid to remove the acid-soluble glass therefrom and render said bundle flexible.

2. A process according to claim 1 wherein said compacting comprises heating and squeezing said fibers together to fuse them to each other.

3. A process according to claim 2 wherein said heating is carried out at approximately 1100–1200° F. and said squeezing is done with approximately 1000 pounds per square inch pressure.

4. A process according to claim 1 wherein said compacting comprises applying an adhesive to said initially leached portions of said bundle around each fiber and squeezing the fibers in said portions together so as to secure said fibers tightly to each other in coherent orientation within said initially leached portions.

5. A process according to claim 4 wherein said adhesive is an epoxy resin.

6. A process according to claim 1 wherein said acid is hydrochloric acid.

7. A process according to claim 1 wherein said central portion of the bundle is leached with acid by immersing the whole bundle in an acid bath for a time sufficient to remove all acid-soluble glass from said bundle.

References Cited

UNITED STATES PATENTS

| | | | |
|---|---|---|---|
| 3,004,368 | 10/1961 | Hicks | 49—79 |
| 2,992,587 | 7/1961 | Hicks | 65—31 X |
| 3,294,504 | 12/1966 | Hicks | 65—31 X |
| 2,995,970 | 8/1961 | Hicks et al. | 65—31 X |
| 3,332,757 | 7/1967 | Hawkins | 65—31 X |
| 3,554,721 | 1/1971 | Gardner | 65—31 X |

ROBERT F. BURNETT, Primary Examiner

R. L. MAY, Assistant Examiner

U.S. Cl. X.R.

65—31; 156—24, 296, 306; 178—DIG 2; 250—227; 350—96